US005933304A

United States Patent [19]

Irissou

[11] Patent Number: 5,933,304

[45] Date of Patent: Aug. 3, 1999

[54] APPARATUS AND METHOD OF INTERRUPTING CURRENT FOR REDUCTIONS IN ARCING OF THE SWITCH CONTACTS

[75] Inventor: Pierre R. Irissou, Sunnyvale, Calif.

[73] Assignee: Carlingswitch, Inc., Plainville, Conn.

[21] Appl. No.: 09/067,808

[22] Filed: Apr. 28, 1998

[51] Int. Cl.[6] .......... H02H 7/22

[52] U.S. Cl. .......... 361/8; 361/3; 361/13

[58] Field of Search .......... 361/2, 3, 5, 8, 361/13, 9, 56, 57, 58, 93, 100, 101, 102, 160; 327/419, 427; 307/98, 99, 112, 113, 116

[56] References Cited

U.S. PATENT DOCUMENTS

| | | | |
|---|---|---|---|
| 3,982,137 | 9/1976 | Penrod | 361/8 |
| 4,321,554 | 3/1982 | Quilter . | |
| 4,466,038 | 8/1984 | Robertson | 361/8 |
| 4,528,608 | 7/1985 | Andersson et al. . | |
| 4,583,146 | 4/1986 | Howell . | |
| 4,618,906 | 10/1986 | Paice et al. | 361/5 |
| 4,631,621 | 12/1986 | Howell . | |
| 4,636,906 | 1/1987 | Anderson et al. | 361/13 |
| 4,636,907 | 1/1987 | Howell . | |
| 4,641,626 | 2/1987 | Morino et al. . | |
| 4,644,309 | 2/1987 | Howell . | |
| 4,652,962 | 3/1987 | Howell . | |
| 4,700,256 | 10/1987 | Howell . | |
| 4,704,652 | 11/1987 | Billings | 361/5 |
| 4,723,187 | 2/1988 | Howell . | |
| 4,745,511 | 5/1988 | Kugelman et al. | 361/8 |
| 4,853,820 | 8/1989 | Ham, Jr. et al. . | |
| 5,048,914 | 9/1991 | Sneddon . | |
| 5,162,965 | 11/1992 | Milberger et al. . | |
| 5,164,872 | 11/1992 | Howell . | |
| 5,179,335 | 1/1993 | Nor . | |
| 5,339,210 | 8/1994 | Howell . | |
| 5,488,530 | 1/1996 | De Jong . | |
| 5,666,255 | 9/1997 | Muelleman . | |
| 5,793,586 | 8/1998 | Rockot et al. | 361/8 |

*Primary Examiner*—Jeffrey Gaffin
*Assistant Examiner*—Kim Huynh
*Attorney, Agent, or Firm*—McCormick, Paulding & Huber

[57] ABSTRACT

A current interrupter circuit includes a primary current path and a secondary current path in parallel with one another and provided between input and output terminals. At least one solid state switch, preferably a power MOSFET, are interposed along the secondary current path. At least one electromagnetic relay has relay contacts for engaging and disengaging the primary path from a power source and from the secondary path. A sequencing circuit provides a first control signal to turn on or maintain on the solid state switches prior to sending a second control signal to open/close the relay contacts, and further provides a third control signal to turn off the solid state switches shortly after the relay contacts are opened, whereby arcing of the contacts is prevented.

13 Claims, 3 Drawing Sheets

APPARATUS AND METHOD OF INTERRUPTING CURRENT FOR REDUCTIONS IN ARCING OF THE SWITCH CONTACTS

FIELD OF THE INVENTION

The present invention relates generally to current interrupters, and more particularly to an electromagnetic current interrupter that includes solid state components which provide for reductions in the arcing associated with the contacts in electromagnetic current interrupters and circuit breakers.

BACKGROUND OF THE INVENTION

Current interruption devices generally comprise electromagnetic circuit breakers for protecting electrical loads from electrical power overloads or surges. Current interruption devices typically employ mechanical contacts which separate in response to an overload condition in order to separate the load from the power source and thus protect the load from the potentially damaging overload condition. The use of electromagnetic relays employing movable contacts has been found to be superior to solid state switches insofar as the contact resistance of the former is substantially less objectionable than the conduction resistance of solid state switches. Electromagnetic relays typically waste less energy and generate less heat than comparably rated solid state switches, at least for circuit interruption devices.

A drawback with movable contact relays is that the contact opening and closing transition time is relatively slow relative to the turning on and off time of the solid state switches. The relatively slow contact transition time and the relatively large voltage difference across open contacts often results in undesirable arcing across the contacts during contact transition.

U.S. Pat. No. 4,700,256 to Howell is directed to circuitry for eliminating arcing across switched contacts. The device employs a parallel combination of mechanical and solid state switches. When the mechanical switch is opened, a voltage difference increase or build-up between the contacts causes electronic circuitry to switch on the solid state switch to temporarily conduct in order to slow down the voltage increase, thereby minimizing arcing. Unfortunately, because the solid state switch is turned on in response to voltage build-up across the contacts, there is a slight delay in turning on the solid state switch and thus some arcing may nonetheless occur which can lead to damage of sensitive electronic components used either in the current interrupter itself or in close proximity thereto.

U.S. Pat. No. 5,164,872 to Howell is directed to a load commutation circuit for arcless interruption of ac current to a load. The device employs a primary current path through a pair of solid state switches which are turned off in response to an overload condition. The current once flowing through the switches is next shunted to and dissipated from a current diverter circuit. Because no current flows through the primary path after the current is shunted, a mechanical switch interposed along the primary current path can be opened without arcing across the switch contacts. A drawback with the above approach is that the primary current path is through the relatively high resistance solid state switches. These solid state switches which may require high current ratings may thus tend to be expensive. Furthermore, the relatively high resistance of the solid state switches will waste electricity in the form of heat generation which must be adequately dissipated. In order to adequately dissipate the heat, the switches tend to be widely spaced from adjoining components, thereby resulting in a relatively large device.

In view of the foregoing, it is an object of the present invention to overcome the drawbacks and disadvantages of prior art current interrupters.

SUMMARY OF THE INVENTION

According to one aspect of the present invention, a current interrupter circuit includes a primary current path defining means having a first end terminal and a second end terminal. A secondary current path defines means having a third end or input terminal and a fourth end or output terminal. The third end terminal is to be coupled to an electrical power source and the fourth end terminal is to be coupled to the second end terminal of the primary current path. At least one solid state switch, preferably a power MOSFET, for handling a dc signal of known polarity, or two solid state switches for handling an ac signal or a dc signal of unknown polarity, are serially interposed back-to-back along the secondary current path between the third and fourth end terminals. At least one electromagnetic relay has relay contacts for engaging and disengaging the first end terminal of the primary path with the third end terminal of the secondary path such that the primary path is coupled to a power source and connected in parallel with the secondary path when the relay engages the first end terminal with the third end terminal, and the primary path is disconnected from the power source when the relay disengages the first end terminal from the third end terminal. A sequencing circuit provides a first control signal to turn on or maintain on the solid state switch(es) prior to sending a second control signal to open/close the relay contacts, and further provides a third control signal to turn off the solid state switch(es) shortly after the relay contacts are opened, whereby arcing of the contacts is prevented.

According to another aspect of the present invention, a method of current interruption includes providing a primary current path having a first end and a second end terminal and electromagnetically controlled contacts at the first end. A secondary current path is provided and has at least two solid state switches serially coupled between a third end or input terminal and a fourth end or output terminal, the third end terminal engageable through the contacts for coupling of an electrical power source and the fourth end terminal coupled to the second end terminal of the primary path. The solid state switches are energized to conduct current along the secondary current path immediately before either engaging/disengaging the first end terminal with the third end terminal. The contacts are activated for engaging/disengaging the first end terminal with the third end terminal while current is flowing through the secondary current path, whereby arcing across the contacts is prevented.

DETAILED DESCRIPTION OF THE PREFERRED EMBODIMENTS

Figure 1:
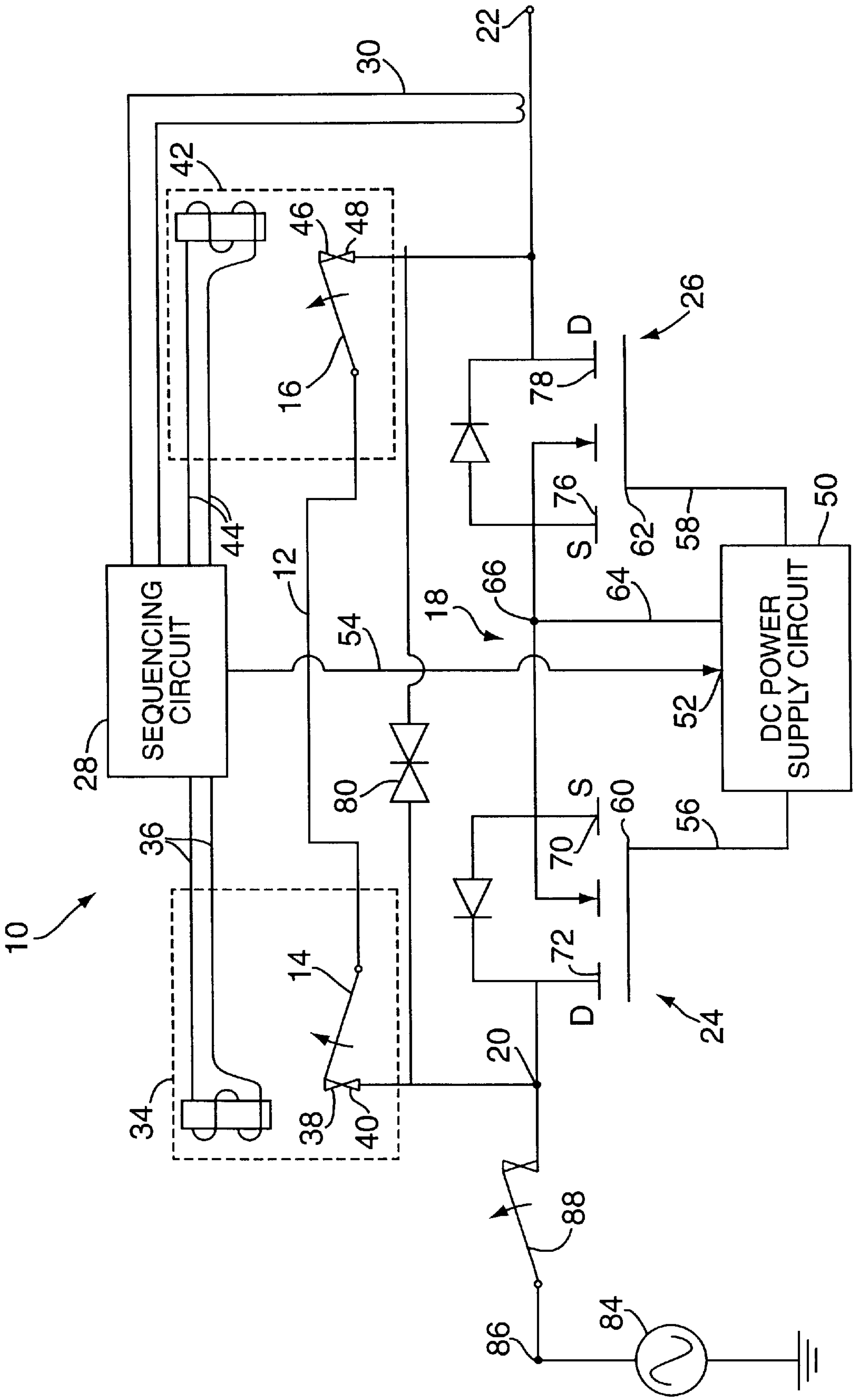
FIG. 1 is a schematic electrical circuit of a current interrupter embodying the present invention.

Turning now to FIG. 1, a current interrupter circuit embodying the present invention is generally designated by the reference number 10. The current interrupter 10 may be employed in a variety of applications where current flow control is necessary, but is typically used in circuit breakers for protecting electrical loads from overload conditions, such as a short circuit, or power surges. The interrupter circuit 10 includes a primary current path 12 having a first end 14 and a second end 16. A secondary current path generally indicated by the reference number 18 has a third end or input terminal 20 and a fourth end or output terminal 22. Solid state switches 24 and 26, preferably power MOSFETs as shown in FIG. 1, are connected back-to-back with one another and interposed along the secondary current path 18 between the third end or input terminal 20 and the fourth end or output terminal 22. The back-to-back power MOSFETs 24, 26 are employed when handling an ac signal or a dc signal of unknown polarity. If a dc signal of known polarity is employed, only one MOSFET need be interposed between the input terminal 20 and the output terminal 22.

Power MOSFETs are preferred over other solid state switches such as SCRs or triacs because a pair of back-to-back MOSFETs can handle both ac or dc signals, and have generally symmetric voltage-versus-current transfer characteristics associated with switching during each half cycle of an ac power source signal. Moreover, unlike SCRs or triacs, power MOSFETs can be turned on or off during any portion of an ac signal. The flexible turn on/off characteristic of power MOSFETs is useful, for example, in providing a soft start feature for large inductive motors. A further advantage of power MOSFETs with the present invention is that the MOSFETs are handling voltage and current transients, and therefore the MOSFETs are selected for their transient rating, as opposed to their continuous rating. Power MOSFETs employed in the present invention are therefore smaller and inexpensive compared with MOSFETs rated to handle the same current and voltage on a continuous basis.

A microprocessor or conventional sequencing circuit 28 is coupled to a current sensor 30 provided adjacent to the output terminal 22 for detecting the total current level flowing through both the primary and secondary current paths. The current sensor 30 may also be provided adjacent to the primary path 12 or the secondary path 18 to detect the current level flowing through the associated current path. A first electromagnetic relay 34 is controllably connected to the sequencing circuit 28 via control lines 36, 36. The first relay 34 includes contacts 38, 40 of which the contact 38 is coupled to the first end 14 of the primary current path 12, and the contact 40 is coupled to the third end 20 of the secondary current path 18.

The interrupter circuit 10 preferably includes a second electromagnetic relay 42 also controllably connected to the sequencing circuit 28 via control lines 44, 44. The second relay 42 includes contacts 46, 48 of which the contact 46 is coupled to the second end 16 of the primary current path 12, and the contact 48 is coupled to the fourth end 22 of the secondary current path 18. The sequencing circuit 28, in response to a current level sensed by the current sensor 30, controllably opens and closes the contacts 38, 40 of the first relay 34 and the contacts 46, 48 of the second relay 42. Preferably the contacts 38, 40 of the first relay 34 are opened and closed synchronously with the contacts 46, 48 of the second relay 42 such that the relays 34 and 42 are either simultaneously opened or closed.

A DC power supply circuit 50 has a control input at 52 for receiving a control signal from the sequencing circuit 28 along the control line 54. The power supply circuit 50 includes first and second output lines 56, 58 respectively coupled to gate 60 of the power MOSFET 24 and gate 62 of the power MOSFET 26. A third output line 64 of the power supply 50 is coupled at a junction 66 along the secondary path 18 between sources of the power MOSFETs 24 and 26. The power supply 50 may be a separate component as shown in FIG. 1, or may be incorporated in the microprocessor or sequencing circuit 28. A surge protector 80, such as a metal oxide varistor (MOV), may be placed in parallel with the MOSFETs 24 and 26 to protect the MOSFETS and other electrical components from voltage transients or other power surges.

A power source 84, such as the AC source as shown in FIG. 1, introduces current from a supply terminal 86 into the current interrupter 10 via the input terminal or third end 20 of the secondary path. The current introduced by the power source 84 leaves the current interrupter 10 via the output terminal 22. An additional protective switch 88 controlled either manually or electronically by, for example, the sequencing circuit 28, may be interposed between the supply terminal 86 and the input terminal 20 of the current interrupter 10 for additional physical isolation between the power supply 84 and the current interrupter 10 when the interrupter is in a non-conduction state.

The current interrupter 10 substantially prevents arcing between the contacts 38, 40 of the first relay 34 and the contacts 46, 48 of the second relay 42 when the current interrupter 10 changes from either an "on-state" (current flow through the current interrupter 10) to an "off-state" (no current flow through the current interrupter 10), or from an off-state to an on-state.

When the current interrupter 10 is in an off-state, the contacts 38, 40 of the first relay 34 and the contacts 46, 48 of the second relay 42 are open which creates an open circuit between the power source 84 and the primary current path 12. The DC power supply 50 receives a control signal from the sequencing circuit 28 via the control line 54 to bias the power MOSFETS 24 and 26 simultaneously to be off or in a non-conducting state via the lines 56, 58 and 64. Consequently, current is prevented from flowing from the input terminal 20 to the output terminal 22 along either one or both of the primary and secondary current paths 12 and 18. The switch 88 may also be opened to provide additional physical isolation between the power source 84 and a load to be coupled to the output terminal 22.

When the current interrupter 10 is to be changed from an off-state to an on-state, the switch 88 is first closed if previously in an open state. The sequencing circuit 28 then transmits a control signal along the control line 54 to the DC supply circuit 50. The supply circuit 50 in response to the received control signal in turn provides bias DC voltage signals to the gates of the power MOSFETs 24, 26 via the lines 56, 58 and 64 in order gate-on the MOSFETs (i.e., switch the MOSFETs from a non-conductive state to a conductive state). Current begins to flow from the input terminal 20 to the output terminal 22 of the current interrupter 10 along the secondary path 18 and through the power MOSFETs 24, 26 disposed therealong.

Shortly after the secondary path 18 becomes conductive, the sequencing circuit 28 sends control signals along lines 36, 36 to the first relay 34 to close the contacts 38, 40, and simultaneously sends control signals along the lines 44, 44 to the second relay 42 to close the contacts 46, 48 in order to connect the primary current path 12 to the power source 84 and to place the primary current path in parallel with the secondary current path 18 between the input terminal 20 and the output terminal 22. As the contacts 38, 40 of the first relay 34 and the contacts 46, 48 of the second relay 42 are being moved closer to one another during closing of contacts, the current flow through the secondary path 18 provides a relatively low voltage difference between the contacts 40, 48, and in turn between opposing contacts in each relay, whereby arcing is prevented between opposing contacts which otherwise might damage electronic components in the vicinity of the relay contacts. Shortly after the primary path 12 becomes conductive, the sequencing circuit 28 may send a further control signal to the DC supply circuit 50 along the control line 54 to enable the supply circuit 50 to transmit a bias signal along the lines 56, 58 and 64 to gate-off or otherwise place the power MOSFETs in a non-conductive state. As such, the current interrupter 10 would thereafter only conduct current while in an on-state through the primary current path 12.

It may be desirable to maintain the power MOSFETs in a conductive state so that current flows through both the primary current path 12 and the secondary current path 18 when the current interrupter 10 is in a current conduction state. Because of the relatively high on resistance of the power MOSFETs 24, 26 relative to that across relay contacts, only a small percentage of the total current flow travels through the secondary current path and through the MOSFETs relative to the primary current path. Consequently, the power MOSFETs employed in the present invention offer several advantages over power MOSFETs employed along the primary current path. The advantages include: no requirement for high power rating MOSFET chips, lower chip cost, smaller MOSFET chip size, less heat generation by the MOSFETs thus leading to a smaller overall current interrupter size because of the ability to more closely space power MOSFETs components together and relative to other components.

When the current level flowing through the current interrupter 10 is above a predetermined threshold level, the sensor 30 detects the current level information and transmits such information to the sequencing circuit 28. The sequencing circuit then sends a control signal to the DC supply circuit 50 via the control line 54 to gate-on or maintain on the power MOSFETs 24 and 26 such that current flows through the secondary path 18 shortly before the primary path 12 is disengaged from the power source 84.

Shortly after current begins to flow or is maintained in its flow along the secondary path 18 through the power MOSFETs 24 and 26, the sequencing circuit 28 transmits a control signal to the first relay 34 via the lines 36, 36 to open the contacts 38, 40, and simultaneously transmits a control signal to the second relay 42 via the lines 44, 44 to open the contacts 46, 48 to disengage the primary current path 12 from the power source 84 and from the secondary current path 18. As the contacts 38, 40 of the first relay 34 and the contacts 46, 48 of the second relay 42 are being moved away from one another during the opening of contacts, the ongoing current flow through the secondary path 18 provides a relatively low voltage differential between the contacts 40, 48, and in turn between opposing contacts in each relay, whereby arcing is prevented between opposing contacts which might otherwise damage electronic components. Shortly after the primary path 12 is disengaged from the power source 84 and thereby becomes non-conductive, the sequencing circuit 28 sends a further control signal to the DC supply circuit 50 along the control line 54 to enable the DC supply circuit 50 to transmit a bias signal along the lines 56, 58 and 64 to gate-off or otherwise place the power MOSFETs in a non-conductive state. As such, the current interrupter 10 no longer provides current flow through either the primary current path 12 or the secondary current path 18, and is therefore in an off-state. The switch 88 may also be opened to provide further physical isolation between the power source 84 and the output terminal 22.

Figure 2:
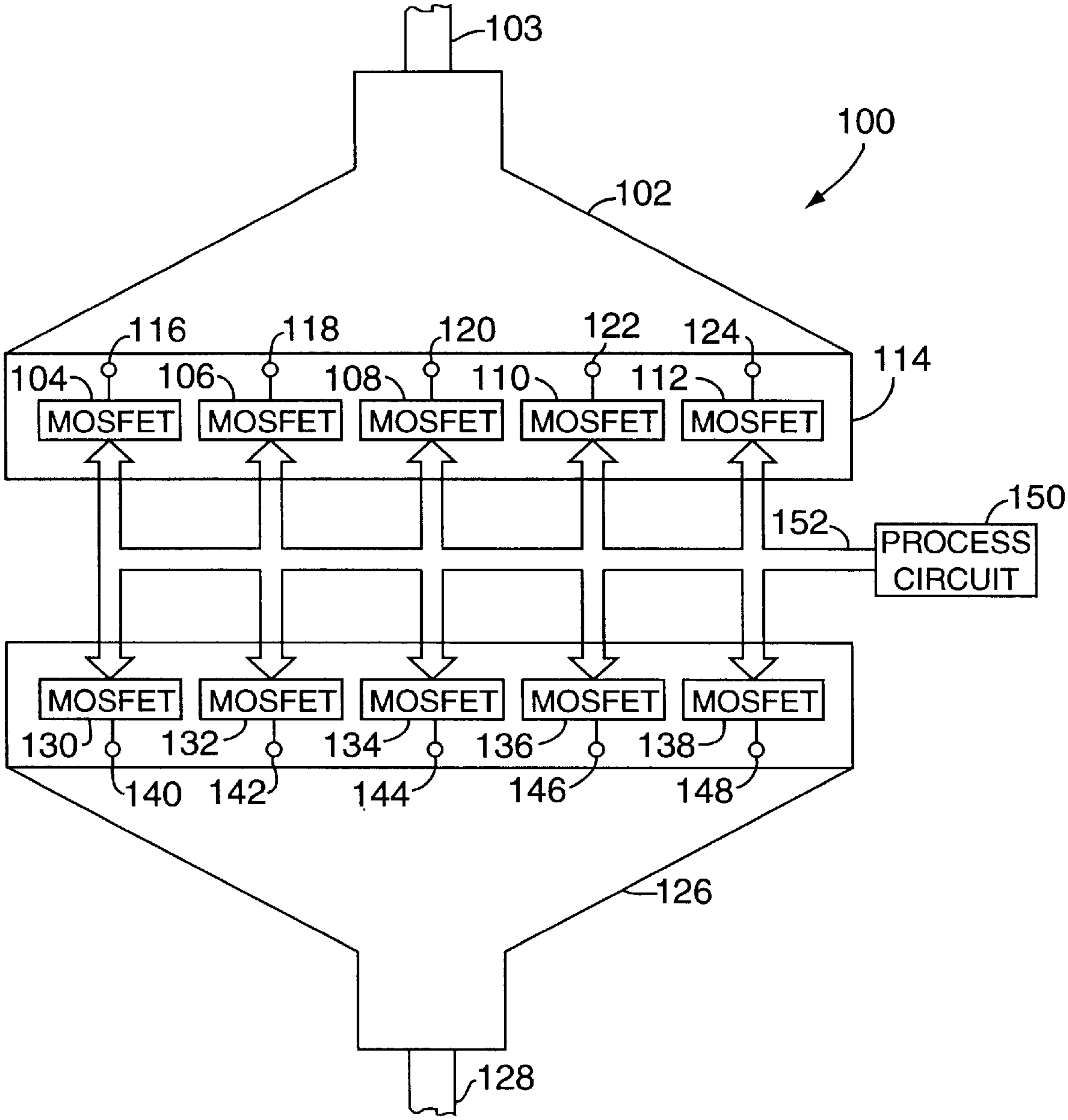
FIG. 2 schematically illustrates a plurality of power MOSFET pairs each forming a secondary current path, and mounted on copper bases.

FIG. 2 schematically illustrates a current interrupter 100 similar to the current interrupter of FIG. 1, which employs copper bases for the power MOSFETs and a plurality of parallel secondary paths for higher current handling. The primary current path is not shown for the sake of simplicity and clarity of illustration. A first connector 102 includes an input cable 103 for enclosing input lines supplied from a power source. A plurality of input-side power MOSFETs 104–112 are mounted on a high thermal dissipation material 114, such as copper base, associated with the first connector 102. The power MOSFETs 104–112 are coupled to an input terminal of the current interrupter via respective terminals 116–124.

A second connector 126 includes an output cable 128 for enclosing output lines issuing from the second connector 126 of the power interrupter 100. A plurality of output-side power MOSFETs 130–138 are mounted on a high thermal dissipation material 139, such as a copper base, associated with the second connector 126. The power MOSFETs 130–138 are coupled to an output terminal of the current interrupter via respective terminals 140–148.

A process circuit 150, comparable to the sequencing circuit 28 and the DC supply circuit 50 of FIG. 1, provides bias signals to the input side MOSFETs 104–112 and the output-side MOSFETs 130–138 via the combined control/secondary path bus 152 which is illustrated as a single bus for the sake of simplicity and clarity of illustration. When the process circuit 150 sends bias signals via the bus 152 for turning-on the MOSFETs, the MOSFETS become conductive to permit current flow along the parallel secondary paths. FIG. 2 illustrates five parallel secondary paths. The first path extends from the input terminal 116 through the MOSFET 104, through the bus 152, through the MOSFET 130 to the output terminal 140. The second path extends from the input terminal 118 through the MOSFET 106, through the bus 152, through the MOSFET 132 to the output terminal 142. The third path extends from the input terminal 120 through the MOSFET 108, through the bus 152, through the MOSFET 134 to the output terminal 144. The fourth path extends from the input terminal 122 through the MOSFET 110, through the bus 152, through the MOSFET 136 to the output terminal 146. The fifth path extends from the input terminal 124 through the MOSFET 112, through the bus 152, through the MOSFET 138 to the output terminal 148. The plurality of parallel secondary paths is advantageous in reducing the level of current which flows through each MOSFET pair, whereby smaller and more inexpensive MOSFETs having smaller power ratings may be substituted for those MOSFETs used in a current interrupter having single or fewer secondary paths. Conversely, the plurality of secondary paths is advantageous in that a current interrupter having such multiple secondary current paths can employ MOSFETs of the same current capacity used in a current interrupter having fewer secondary paths to handle substantially higher levels of current through the current interrupter.

Figure 3:
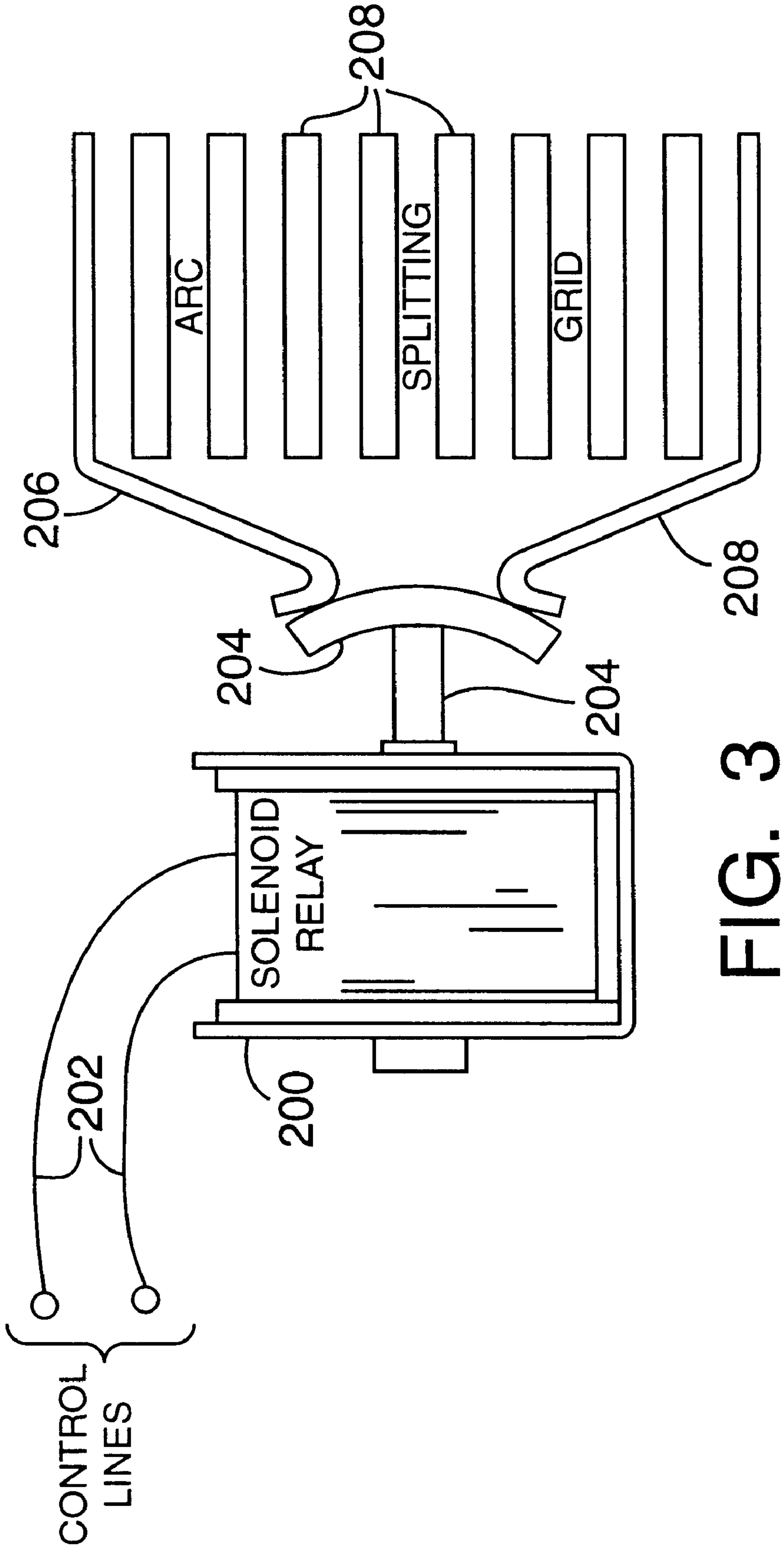
FIG. 3 schematically illustrates a diverging horn and arc splitting grid structure for the current interrupter to further substantially prevent arcing.

FIG. 3 illustrates a structural configuration associated with a current interrupter embodying the present invention as discussed with respect to the preceding figures and which further prevents arcing between opening and closing of the relay contacts. As shown in FIG. 3, a solenoid or relay 200 includes control lines 202, 202 to be coupled to a processing circuit (not shown). A bridge contact 204 is moved into contact or separated from opposing contacts 206, 208 in the form of diverging horns. A plurality of electricallyconducting grids 208, 208 are spaced between the opposing contacts 206, 208.

When the solenoid or relay 200 is activated, the bridge contact 204 comes into contact with the opposing contacts 206, 208 to provide current flow through a primary current path (not shown). The grids 208, 208 provide arc splitting to substantially eliminate or diffuse arc formation that could otherwise occur because of a high voltage difference between the contacts 206 and 208.

Although this invention has been shown and described with respect to exemplary embodiments thereof, it should be understood by those skilled in the art that the foregoing and various other changes, omissions, and additions in the form and detail thereof may be made therein without departing from the spirit and scope of the invention. For example, the ac power source may be replaced by a dc power source. Further, the sequencing circuit and DC power source for the solid state switches may be embodied either separately or integrally in conventional microprocessors which may, in turn, be a part of or interfaced with other control means, such as computers. Moreover, other power switches such as IGBTs or derivatives of MOSFETs which act similar to MOSFETs may be employed. Accordingly, the preceding specification is to be taken by way of illustration rather than limitation.

What is claimed is:

1. A current interrupter circuit comprising:

a primary current path having a first end terminal and a second end terminal;

a secondary current path having a third end or input terminal and a fourth end or output terminal, the third end terminal to be coupled to an electrical power source and the fourth end terminal to be coupled to the second end terminal of the primary current path;

at least one solid state switch interposed along the secondary current path between the third and fourth end terminals;

a first electromagnetic relay having relay contacts for engaging and disengaging the first end terminal of the primary path with the third end terminal of the secondary path such that the primary path is coupled to a power source and connected in parallel with the secondary path when the relay engages the first end terminal with the third end terminal, and the primary path is disconnected from the power source when the relay disengages the first end terminal from the third end terminal;

a second electromagnetic relay having relay contacts for engaging and disengaging the second end terminal of the primary current path with the fourth end terminal of the secondary path; and a sequencing circuit providing a first control signal to turn on or maintain on the solid state switch prior to sending a second control signal to open/close the relay contacts of the first and second electromagnetic relays, and providing a third control signal to turn off the solid state switch shortly after the relay contacts of the first and second electromagnetic relays are opened, whereby arcing of the contacts is prevented.

2. A current interrupter circuit as defined in claim 1, wherein the solid state switch is a power MOSFET.

3. A current interrupter circuit as defined in claim 2, further including a DC supply controllably coupled to the sequencing circuit for passing a DC voltage bias signal to a gate of the power MOSFET.

4. A current interrupter circuit as defined in claim 3, further including a copper base, the power MOSFET being mounted on the copper base which provides heat dissipation, and to thereby permit close spacing of the power MOSFET and other components to one another.

5. A current interrupter circuit as defined in claim 1, further including a current sensor coupled to the sequencing circuit for sensing the current level flowing through at least one of the primary and secondary current paths.

6. A current interrupter circuit as defined in claim 1, further including a protective switch interposed between the electrical power source and the third end of the secondary current path for providing additional electrical isolation of the electrical power source from the output terminal of the current interrupter circuit.

7. A current interrupter circuit as defined in claim 1, further including a plurality of electrically-conductive grids interposed between the second end terminal and the fourth end terminal.

8. A current interruptor as defined in claim 1, wherein an additional solid state switch is serially connected back-to-back with the other solid state switch between the third and fourth end terminals in order to handle an ac signal or a dc signal of unknown polarity.

9. A method of current interruption comprising the steps of:

providing a primary current path having a first end and a second end terminal and electromagnetically controlled contacts at the first end and at the second end;

providing a secondary current path having at least one solid state switch coupled between a third end or input terminal and a fourth end or output terminal, the third end terminal engageable through the contacts at the first end for coupling of an electrical power source and the fourth end terminal coupled to the second end terminal of the primary path through the contacts at the second end;

energizing the solid state switch to conduct current along the secondary current path immediately before either engaging/disengaging the first end terminal with the third end terminal, and the second end terminal with the fourth end terminal; and activating the contacts at the first end for engaging/disengaging the first end terminal with the third end terminal, and for engaging/disengaging the second end terminal with the fourth end terminal while current is flowing through the secondary current path and for turning off of the solid state switch shortly after the contacts are disengaged, whereby arcing across the contacts is prevented.

10. A method of current interruption as defined in claim 9, wherein the step of turning on the solid state switch includes turning on a power MOSFET.

11. A method of current interruption as defined in claim 9, further including the step of sensing the current level flowing through the current interrupter, and the step of engaging/disengaging includes engaging/disengaging of the first end terminal with the third end terminal, and the second end terminal with the fourth end terminal in response to the current level flowing through the current interrupter.

12. A method of current interruption as defined in claim 9, further including the step of interposing electrically-conductive grids between the second and fourth terminals to provide arc splitting between the first and second terminals.

13. A method of current interruption as defined in claim 9, wherein the step of providing a secondary current path includes providing an additional solid state switch serially coupled back-to-back with the other solid state switch between the input terminal and the output terminal in order to handle an ac signal or a dc signal of unknown polarity.

* * * * *